(12) United States Patent
Pena (10) Patent No.: US 11,191,393 B2
(45) Date of Patent: Dec. 7, 2021

(54) HANDHELD HERB GRINDER AND VACUUM

(71) Applicant: Lidia Pena, W. Haverstraw, NY (US)

(72) Inventor: Lidia Pena, W. Haverstraw, NY (US)

( * ) Notice: Subject to any disclaimer, the term of this patent is extended or adjusted under 35 U.S.C. 154(b) by 372 days.

(21) Appl. No.: 16/378,767

(22) Filed: Apr. 9, 2019

(65) Prior Publication Data
US 2020/0323392 A1  Oct. 15, 2020

(51) Int. Cl.
*A47J 42/26* (2006.01)
*A47J 42/38* (2006.01)

(52) U.S. Cl.
CPC ............... *A47J 42/26* (2013.01); *A47J 42/38* (2013.01)

(58) Field of Classification Search
CPC .. A47J 42/26; A47J 42/38; A47J 42/06; A47J 42/16; A47J 42/36; A47J 43/04; A47J 43/00; B26B 19/44; B26B 19/46; B26B 19/48
See application file for complete search history.

(56) References Cited

U.S. PATENT DOCUMENTS

| | | | |
|---|---|---|---|
| D689,347 S | 9/2013 | Hainbach | |
| 8,695,906 B2 | 4/2014 | Hainbach | |
| 9,629,510 B1 | 4/2017 | Willhoyt | |
| 9,814,259 B1 | 11/2017 | Richmond | |
| 2004/0025703 A1* | 2/2004 | Ming | A47J 31/42 99/286 |
| 2009/0277012 A1* | 11/2009 | Mikula | B26B 19/44 30/41.6 |
| 2010/0301806 A1 | 12/2010 | Ormaza | |
| 2013/0091802 A1* | 4/2013 | Bentley | A47J 42/26 53/111 R |
| 2014/0353412 A1* | 12/2014 | Grumbacher | A24C 5/40 241/70 |
| 2016/0029691 A1 | 2/2016 | Ruzycky | |
| 2016/0106262 A1 | 4/2016 | Mroue | |
| 2017/0217032 A1* | 8/2017 | Knapp | B26B 19/14 |
| 2017/0245541 A1* | 8/2017 | Pagan | A47J 42/34 |
| 2017/0297033 A1* | 10/2017 | Li | B02C 18/24 |
| 2017/0319009 A1* | 11/2017 | Seckel | B02C 18/2216 |

FOREIGN PATENT DOCUMENTS

| | | | | |
|---|---|---|---|---|
| CA | 2909262 | | 8/2017 | |
| CN | 106137024 A | * | 11/2016 | |
| EP | 1935301 A1 | * | 6/2008 | ............. A47J 42/46 |
| EP | 2361539 A1 | * | 8/2011 | ............. A47J 31/42 |
| WO | WO-2015032134 A1 | * | 3/2015 | ............. A47J 42/38 |

* cited by examiner

*Primary Examiner* — Teresa M Ekiert
*Assistant Examiner* — Sarkis A Aktavoukian (57) ABSTRACT

The handheld herb grinder and vacuum is a tool. The handheld herb grinder and vacuum is configured for use in grinding plant-based materials presented to the handheld herb grinder and vacuum in a bulk solid form. The handheld herb grinder and vacuum comprises a housing, a vacuum device, a grinding device, and a control circuit. The housing contains the vacuum device, the grinding device, and a control circuit. The grinding device grinds the plant-based material. The vacuum device creates a pressure differential that draws spilled plant-based material into the housing. The control circuit controls the operation of the grinding device and the vacuum device.

13 Claims, 5 Drawing Sheets

HANDHELD HERB GRINDER AND VACUUM

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of human necessities including domestic appliances, more specifically, a spice mill. (A47J42/32)

SUMMARY OF INVENTION

The handheld herb grinder and vacuum is a tool. The handheld herb grinder and vacuum is configured for use in grinding plant-based materials presented to the handheld herb grinder and vacuum in a bulk solid form. The handheld herb grinder and vacuum comprises a housing, a vacuum device, a grinding device, and a control circuit. The housing contains the vacuum device, the grinding device, and a control circuit. The grinding device grinds the plant-based material. The vacuum device creates a pressure differential that draws spilled plant-based material into the housing. The control circuit controls the operation of the grinding device and the vacuum device.

These together with additional objects, features and advantages of the handheld herb grinder and vacuum will be readily apparent to those of ordinary skill in the art upon reading the following detailed description of the presently preferred, but nonetheless illustrative, embodiments when taken in conjunction with the accompanying drawings.

In this respect, before explaining the current embodiments of the handheld herb grinder and vacuum in detail, it is to be understood that the handheld herb grinder and vacuum is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the handheld herb grinder and vacuum.

It is therefore important that the claims be regarded as including such equivalent construction insofar as they do not depart from the spirit and scope of the handheld herb grinder and vacuum. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Detailed reference will now be made to one or more potential embodiments of the disclosure, which are illustrated in FIGS. 1 through 8.

The handheld herb grinder and vacuum 100 (hereinafter invention) is a tool. The invention 100 is configured for use in grinding plant-based material 191 presented to the invention 100 in a bulk solid form. The invention 100 comprises a housing 101, a vacuum device 102, a grinding device 103, and a control circuit 104. The housing 101 contains the vacuum device 102, the grinding device 103, and a control circuit 104. The grinding device 103 grinds the plant-based material 191. The vacuum device 102 creates a pressure differential that draws spilled plant-based material 191 into the housing 101. The control circuit 104 controls the operation of the grinding device 103 and the vacuum device 102.

The housing 101 forms the exterior shell of the invention 100. The housing 101 is a rigid hollow composite prism structure. The housing 101 contains the vacuum device 102, the grinding device 103, and the control circuit 104. The housing 101 is formed with all apertures and form factors necessary to allow the housing 101 to accommodate the use, the operation, and the external connections of the vacuum device 102, the grinding device 103, and the control circuit 104. Methods to form a housing 101 suitable for the purposes described in this disclosure are well-known and documented in the mechanical arts. The housing 101 comprises an intake chamber 111, a pressure chamber 112, a storage chamber 113, and a plurality of threaded connections 114.

The intake chamber 111 is a hollow prism-shaped capped tube. The intake chamber 111 contains a portion of the vacuum device 102. The intake chamber 111 is formed with all apertures and form factors necessary to allow the intake chamber 111 to accommodate the use, the operation, and the external connections of the vacuum device 102. Methods to form an intake chamber 111 suitable for the purposes described in this disclosure are well-known and documented in the mechanical arts. The intake chamber 111 further comprises an intake aperture 115.

The intake aperture 115 is an aperture. The intake aperture 115 is formed through the closed congruent face of the intake chamber 111. The vacuum device 102 draws the plant-based material 191 through the intake aperture 115 into the intake chamber 111.

The pressure chamber 112 is a hollow prism-shaped tube. The pressure chamber 112 contains a portion of the vacuum device 102. The pressure chamber 112 is formed with all apertures and form factors necessary to allow the pressure chamber 112 to accommodate the use, the operation, and the external connections of the vacuum device 102. The form factor of the two congruent faces of the prism-structure of the pressure chamber 112 is geometrically similar to the form factor of the two congruent faces of the prism-structure of the intake chamber 111. Methods to form a pressure chamber 112 suitable for the purposes described in this disclosure are well-known and documented in the mechanical arts.

The storage chamber 113 is a hollow prism-shaped capped tube. The storage chamber 113 contains the grinding device 103. The storage chamber 113 is formed with all apertures and form factors necessary to allow the storage chamber 113 to accommodate the use, the operation, and the external connections of the grinding device 103. The form factor of the two congruent faces of the prism-structure of the storage chamber 113 is geometrically similar to the form factor of the two congruent faces of the prism-structure of the pressure chamber 112. Methods to form a storage chamber 113 suitable for the purposes described in this disclosure are well-known and documented in the mechanical arts. The storage chamber 113 further comprises a discharge aperture 116.

Figure 1:
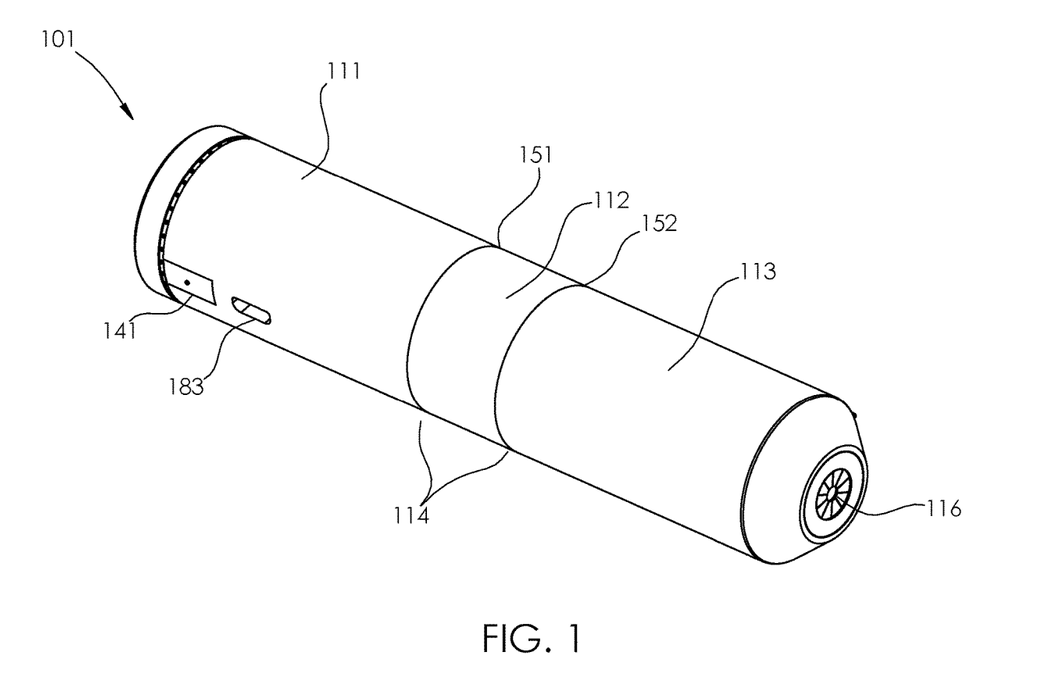
FIG. 1 is a perspective view of an embodiment of the disclosure.
Figure 2:
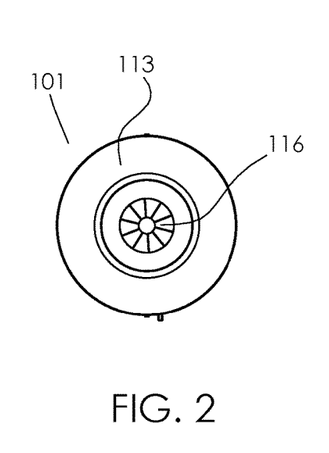
FIG. 2 is a front closed view of an embodiment of the disclosure.
Figure 2A:
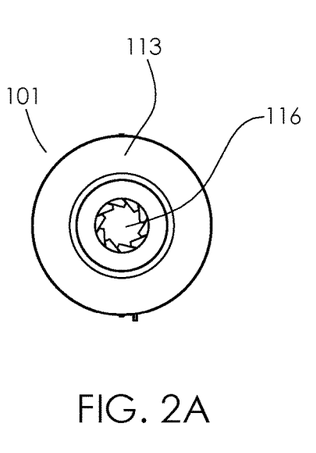
FIG. 2A is a front open view of an embodiment of the disclosure.
Figure 3:
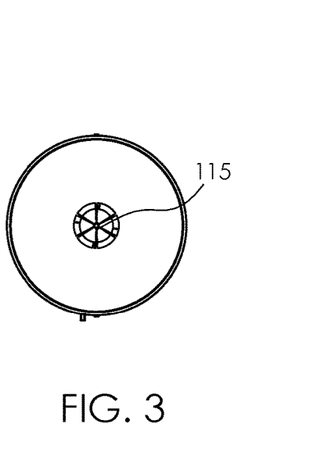
FIG. 3 is a rear view of an embodiment of the disclosure.
Figure 4:
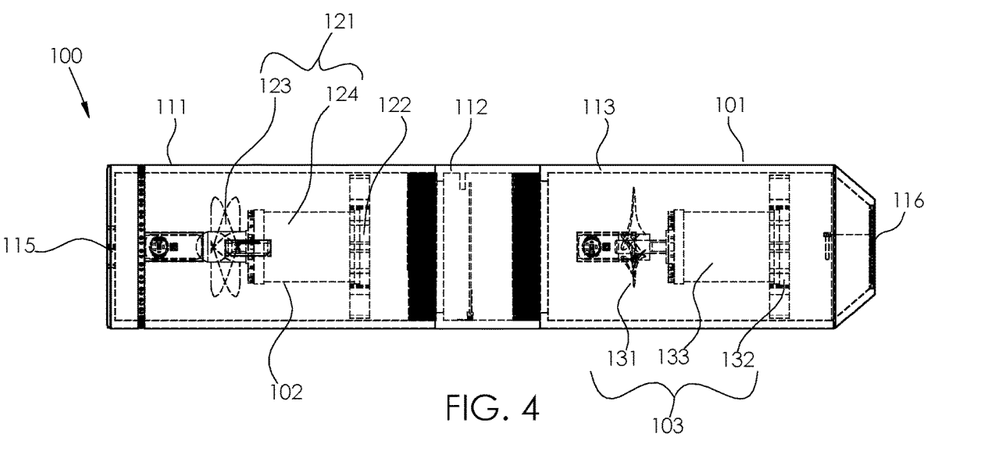
FIG. 4 is a cross-sectional view of an embodiment.
Figure 5:
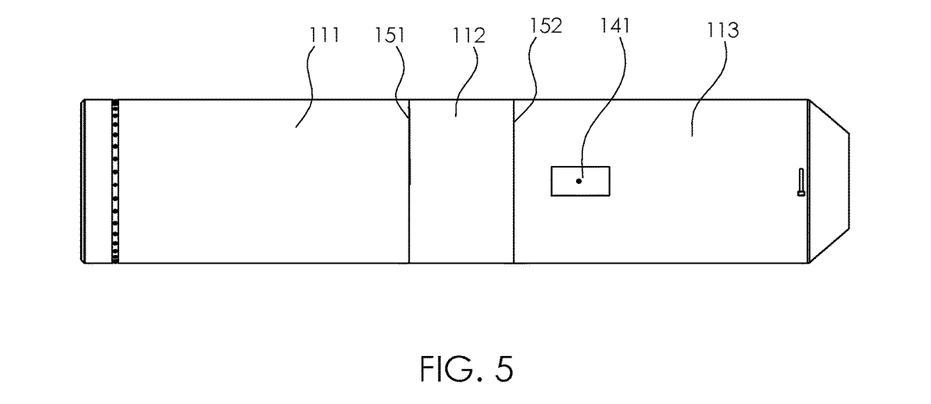
FIG. 5 is a side view of an embodiment of the disclosure.
Figures 6, 6A:
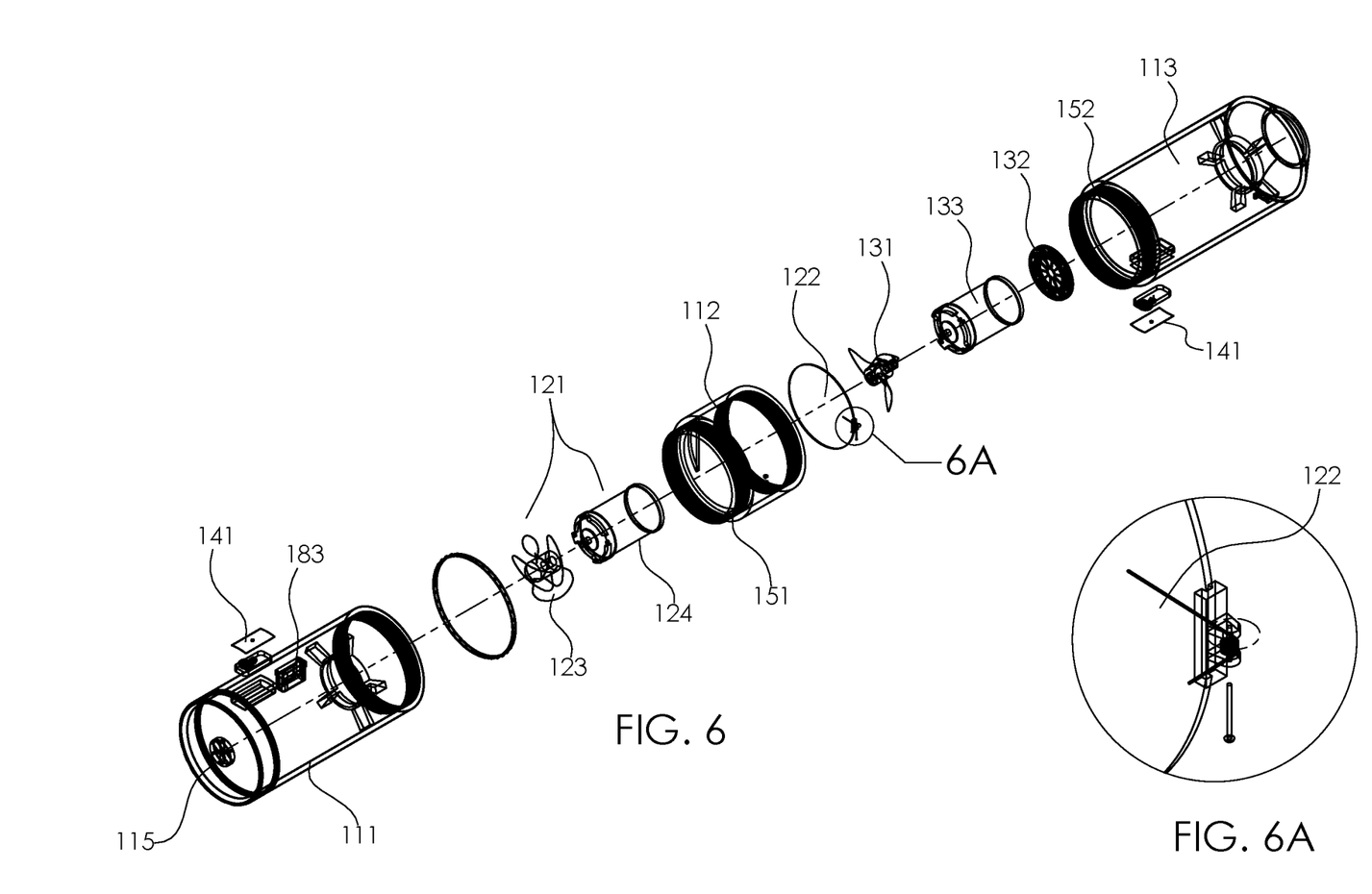
FIG. 6 is an exploded view of an embodiment of the disclosure.
FIG. 6A is detail provided in FIG. 6.
Figure 7:
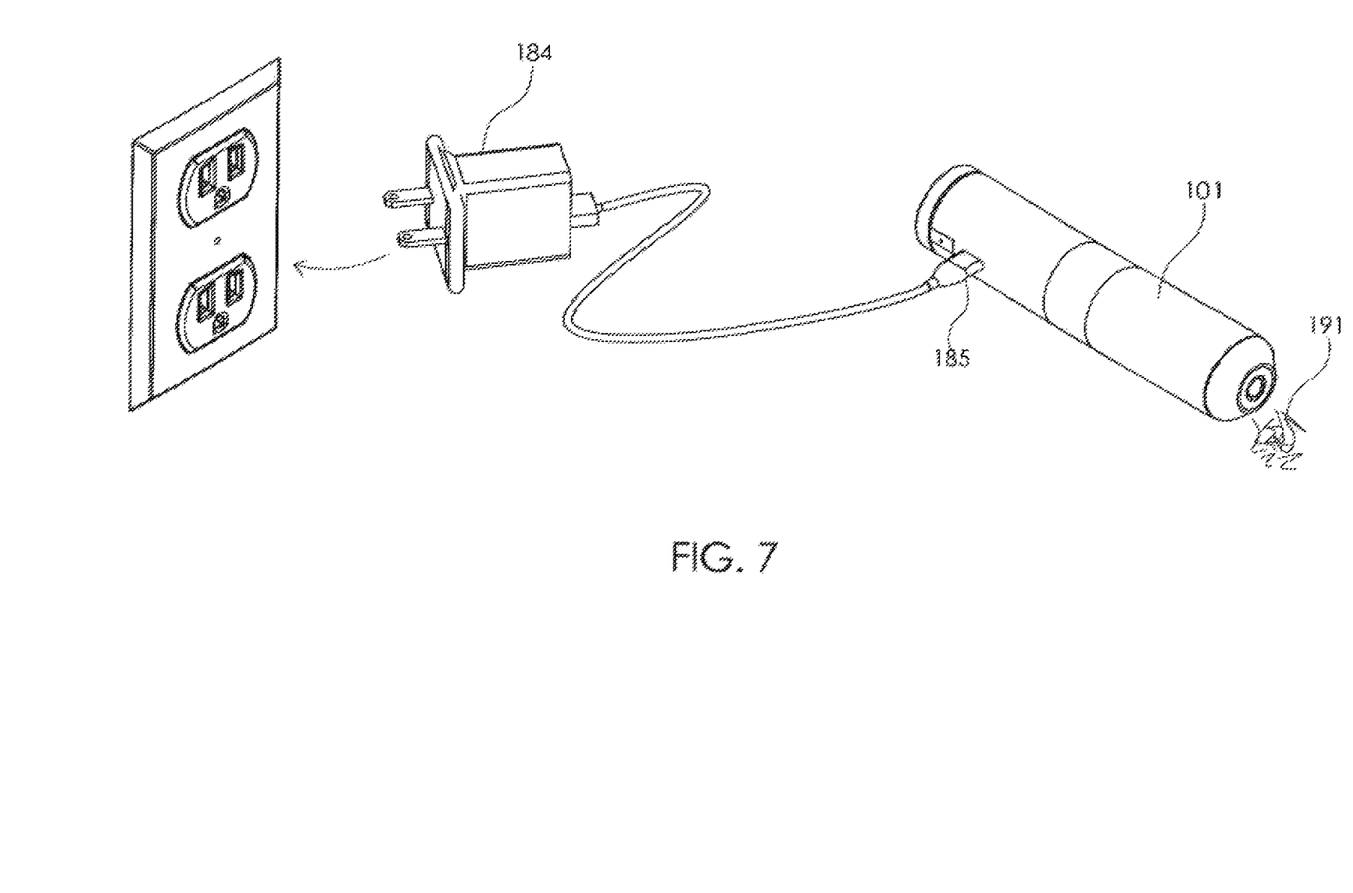
FIG. 7 is an in-use view of an embodiment of the disclosure.

The discharge aperture 116 is a nozzle structure formed through the closed congruent face of the storage chamber 113. The ground plant-based material 191 is discharged from the storage chamber 113 through the discharge aperture 116. As shown most clearly in FIGS. 2a and 2b, the nozzle that forms the discharge aperture 116 opens and closes such that the ground plant-based material 191 can be stored within the storage chamber 113 until use.

Each of the plurality of threaded connections 114 is a threaded connection. Each of the plurality of threaded connections 114 forms an attachment selected from the group consisting of: a) the open congruent face of the capped tube structure of the intake chamber 111 to an open congruent face of the pressure chamber 112; and, b) the open congruent face of the capped tube structure of the storage chamber 113 to an open congruent face of the pressure chamber 112. The threaded connection is defined in greater detail elsewhere in this disclosure. The plurality of threaded connections 114 comprises a first threaded connection 151 and a second threaded connection 152.

The first threaded connection 151 is the threaded connection selected from the plurality of threaded connections 114 that attaches the open congruent face of the intake chamber 111 to an open congruent face of the pressure chamber 112.

The second threaded connection 152 is the threaded connection selected from the plurality of threaded connections 114 that attaches the open congruent face of the storage chamber 113 to an open congruent face of the pressure chamber 112.

The vacuum device 102 is a mechanical device. The vacuum device 102 draws any loose plant-based material 191 resting on a surface into the housing 101. The vacuum device 102 further illuminates the plant-based material 191. The vacuum device 102 comprises a fan 121 and a check valve 122.

The fan 121 is a mechanical device that generates a pressure differential which is used for transporting the air and the plant-based material 191 from the exterior of the intake chamber 111 through both the intake aperture 115 and the intake chamber 111 into the pressure chamber 112. The fan 121 further comprises a vacuum blade assembly 123 and a vacuum motor 124. The vacuum motor 124 is further defined with a ninth lead 209 and a tenth lead 210.

The vacuum blade assembly 123 is a rotating bladed structure. The rotation of the vacuum blade assembly 123 generates an air flow that generates the pressure differential created by the fan 121. The vacuum blade assembly 123 is rotated by the vacuum motor 124. The vacuum motor 124 is an electric motor. The vacuum motor 124 provides the motive forces required by the fan 121 to generate a pressure differential. The vacuum motor 124 rotates the vacuum blade assembly 123.

The check valve 122 is a valve that mounts in the pressure chamber 112. The check valve 122 controls the flow of air and the plant-based material 191 between the pressure chamber 112 and the storage chamber 113 to the direction from the pressure chamber 112 to the storage chamber 113. The use of a check valve 122 is well-known and documented in the mechanical arts.

The grinding device 103 is a mechanical device that reduces the plant-based material 191 into smaller particulates of comparable size. By comparable size is meant the diameter of any first ground particle is not significantly different from the diameter of any second ground particle. The grinding device 103 comprises a flow drive 131, a grinder blade assembly 132, and a grinder motor 133. The grinder motor 133 is further defined with an eleventh lead 211 and a twelfth lead 212.

The flow drive 131 is a bladed structure. The flow drive 131 is a rotating structure. The flow drive 131 drives the plant-based material 191 towards the grinder blade assembly 132 while the plant-based material 191 is in a bulk solid form. The flow drive 131 is driven by the grinder motor 133. The grinder blade assembly 132 is a rotating bladed structure. The grinder blade assembly 132 is a mechanical device that grinds the plant-based material 191. The grinder blade assembly 132 is rotated by the grinder motor 133. The grinder motor 133 is an electric motor. The grinder motor 133 provides the motive forces required by the grinder blade assembly 132 to grind the plant-based material 191. The grinder motor 133 rotates the grinder blade assembly 132.

The control circuit 104 is an electrical circuit. The control circuit 104 controls the operation of the vacuum device 102. The control circuit 104 further illuminates the plant-based material 191 as the vacuum device 102 draws the plant-based material 191 into the housing 101. The control circuit 104 controls the operation of the grinding device 103. The control circuit 104 comprises a plurality of switches 141, a lamp 142, and a power circuit 143.

Each of the plurality of switches 141 is an electrical switch that forms a circuit element within the control circuit 104. Each of the plurality of switches 141 controls the flow of electricity into an electrical sub-circuit of the control circuit 104 selected from the group consisting of the vacuum motor 124, the grinder motor 133, and the lamp 142. The plurality of switches 141 comprises a first momentary switch 161, a second momentary switch 162, and an illumination switch 163. The illumination switch 163 is further defined with a first lead 201 and a second lead 202. The first momentary switch 161 is further defined with a third lead 203 and a fourth lead 204. The second momentary switch 162 is further defined with a fifth lead 205 and a sixth lead 206.

The first momentary switch 161 controls the flow of electrical energy from the power circuit 143 into the grinder motor 133. The second momentary switch 162 controls the flow of electrical energy from the illumination switch 163 into the vacuum motor 124. The illumination switch 163 controls the flow of electrical energy from the power circuit 143 into the lamp 142. The illumination switch 163 further controls the flow of electrical energy from the power circuit 143 into the second momentary switch 162.

The lamp 142 is an electrical sub-circuit of the control circuit 104. The lamp 142 generates illumination used to illuminate the plant-based material 191 as it is drawn into the intake aperture 115 by the vacuum device 102. The lamp 142 comprises an LED 171 and a pull-down resistor 172. The LED 171 is further defined with a second anode 222 and a second cathode 224. The pull-down resistor 172 is further defined with a seventh lead 207 and an eighth lead 208.

The LED 171 is a two-terminal semiconducting device. The LED 171 generates the illumination used by the lamp 142 to illuminate the plant-based material 191 as it is drawn into the intake aperture 115. The pull-down resistor 172 is a circuit element that is placed in series with the LED 171. The pull-down resistor 172 limits the electrical current flow through the LED 171. The pull-down resistor 172 further presents an operating voltage across the vacuum motor 124.

The power circuit 143 is an electrical sub-circuit of the control circuit 104. The power circuit 143 stores and distributes the electrical energy necessary to operate the invention 100. The power circuit 143 comprises a battery 181, a diode 182, a charging port 183, and an external power source 184. The external power source 184 further comprises a charging plug 185. The battery 181 is further defined with a first positive terminal 217 and a first negative terminal 219. The external power source 184 is further defined with a second positive terminal 218 and a second negative terminal 220. The diode 182 is further defined with a first anode 221 and a first cathode 223. The charging port 183 is further defined with a thirteenth lead 213 and a fourteenth lead 214. The charging plug 185 is further defined with a fifteenth lead 215 and a sixteenth lead 216.

The battery 181 is a commercially available rechargeable battery 181. The chemical energy stored within the rechargeable battery 181 is renewed and restored through the use of the charging port 183. The charging port 183 is an electrical circuit that reverses the polarity of the rechargeable battery 181 and provides the energy necessary to reverse the chemical processes that the rechargeable battery 181 initially used to generate the electrical energy. This reversal of the chemical process creates a chemical potential energy that will later be used by the rechargeable battery 181 to generate electricity.

The charging port 183 attaches to an external power source 184 using a charging plug 185. The charging port 183 receives electrical energy from the external power source 184 through the charging plug 185. The diode 182 is an electrical device that allows current to flow in only one direction. The diode 182 installs between the rechargeable battery 181 and the charging port 183 such that electricity will not flow from the first positive terminal 217 of the rechargeable battery 181 into the second positive terminal 218 of the external power source 184. In the first potential embodiment of the disclosure, the external power source 184 and the charging port 183 are compatible with USB power requirements.

Figure 8:
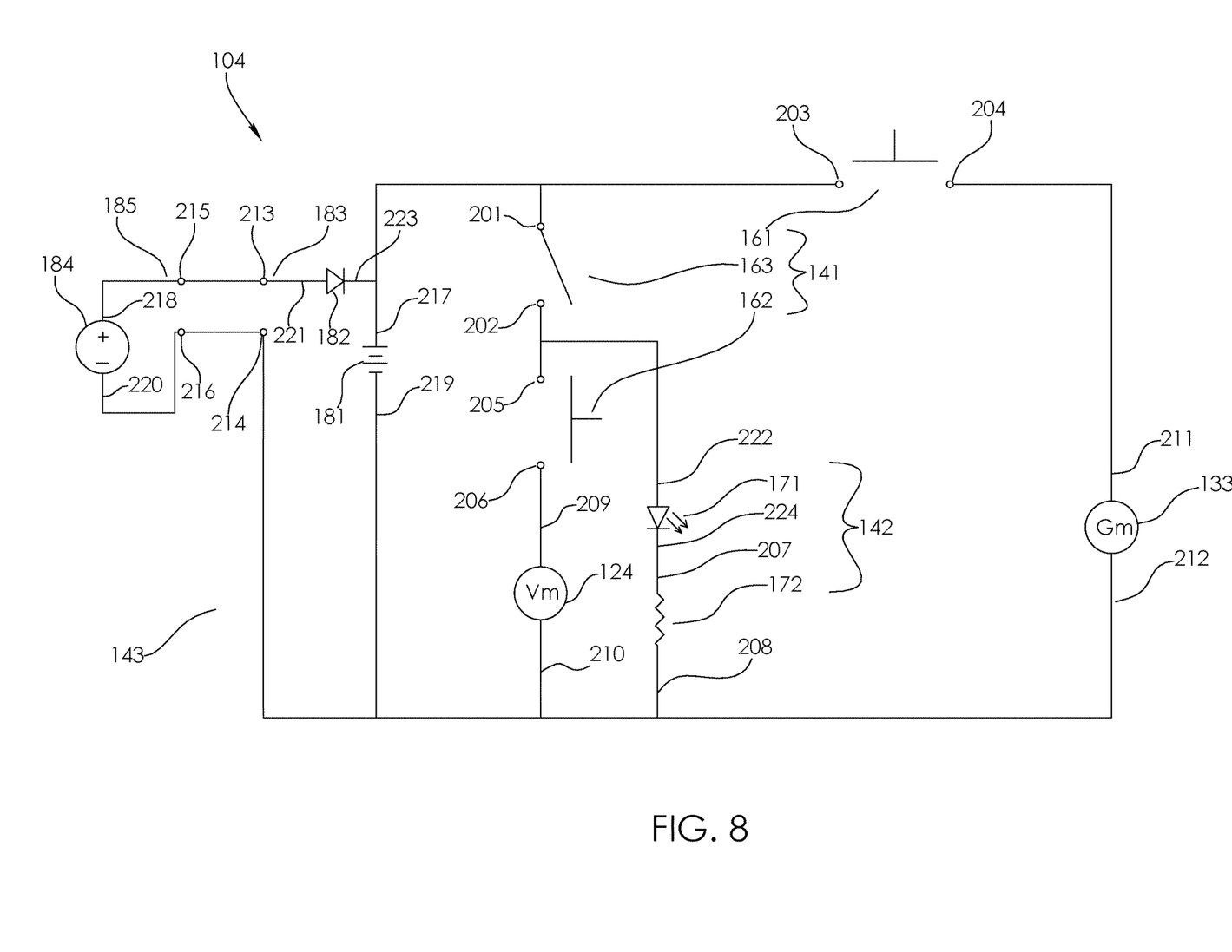
FIG. 8 is a schematic view of an embodiment of the disclosure.

The following three paragraphs describe the assembly of the control circuit 104.

The first positive terminal 217 of the battery 181 electrically connects to the first lead 201 of the illumination switch 163. The first positive terminal 217 of the battery 181 electrically connects to the third lead 203 of the first momentary switch 161. The second lead 202 of the illumination switch 163 electrically connects to the fifth lead 205 of the second momentary switch 162. The second lead 202 of the illumination switch 163 electrically connects to the second anode 222 of the LED 171. The second cathode 224 of the LED 171 electrically connects to the seventh lead 207 of the pull-down resistor 172. The sixth lead 206 of the second momentary switch 162 electrically connects to the ninth lead 209 of the vacuum motor 124. The fourth lead 204 of the first momentary switch 161 electrically connects to the eleventh lead 211 of the grinder motor 133.

The second positive terminal 218 of the external power source 184 electrically connects to the fifteenth lead 215 of the charging plug 185. The fifteenth lead 215 of the charging plug 185 electrically connects to the thirteenth lead 213 of the charging port 183. The thirteenth lead 213 of the charging port 183 electrically connects to the first anode 221 of the diode 182. The first cathode 223 of the diode 182 electrically connects to the first positive terminal 217 of the battery 181. The second negative terminal 220 of the external power source 184 electrically connects to the sixteenth lead 216 of the charging plug 185. The sixteenth lead 216 of the charging plug electrically connects to the fourteenth lead 214 of the charging port 183.

The fourteenth lead 214 of the charging port 183 electrically connects to the first negative terminal 219 of the battery 181. The tenth lead 210 of the vacuum motor 124 electrically connects to the first negative terminal 219 of the battery 181. The eighth lead 208 of the pull-down resistor 172 electrically connects to the first negative terminal 219 of the battery 181. The twelfth lead 212 of the grinder motor 133 electrically connects to the first negative terminal 219 of the battery 181.

The following definitions were used in this disclosure:

Align: As used in this disclosure, align refers to an arrangement of objects that are: 1) arranged in a straight plane or line; 2) arranged to give a directional sense of a plurality of parallel planes or lines; or, 3) a first line or curve is congruent to and overlaid on a second line or curve.

Anodes and Cathodes: As used in this disclosure, an anode and a cathode are the connecting terminals of an electrical circuit element or device. Technically, the cathode is the terminal through which the physical electrons flow into the device. The anode is the terminal through which the physical electrons flow out of the device. As a practical matter, the anode refers to: 1) the positive terminal of a power consuming electrical circuit element; 2) the negative terminal of a discharging battery or an electrical power source; and, 3) the positive terminal of a charging battery. As a further practical matter, the cathode refers to: 1) the negative terminal of a power consuming electrical circuit element; 2) the positive terminal of a discharging battery or an electrical power source; and, 3) the negative terminal of a charging battery.

Aperture: As used in this disclosure, an aperture is a prism-shaped negative space that is formed completely through a structure or the surface of a structure.

Battery: As used in this disclosure, a battery is a chemical device consisting of one or more cells, in which chemical energy is converted into electricity and used as a source of power. Batteries are commonly defined with a positive terminal and a negative terminal.

Blade: As used in this disclosure, a blade is a term that is used to describe: 1) a wide and flat portion of a structure; or, 2) the cutting edge of a tool.

Bulk Solid: As used in this disclosure, a bulk solid is a material that is formed from an accumulation of discrete particles. While the discrete particles of the bulk solid are solid materials, in aggregate the physical performance of bulk solid will exhibit fluid characteristics such as flow or taking the shape of a container.

Cable: As used in this disclosure, a cable is a collection of insulated wires covered by a protective casing that is used for transmitting electricity or telecommunication signals.

Capped Tube: As used in this disclosure, a capped tube is a tube with one closed end and one open end.

Center: As used in this disclosure, a center is a point that is: 1) the point within a circle that is equidistant from all the points of the circumference; 2) the point within a regular polygon that is equidistant from all the vertices of the regular polygon; 3) the point on a line that is equidistant from the ends of the line; 4) the point, pivot, or axis around which something revolves; or, 5) the centroid or first moment of an area or structure. In cases where the appropriate definition or definitions are not obvious, the fifth option should be used in interpreting the specification.

Center Axis: As used in this disclosure, the center axis is the axis of a cylinder or a prism. The center axis of a prism is the line that joins the center point of the first congruent face of the prism to the center point of the second corresponding congruent face of the prism. The center axis of a pyramid refers to a line formed through the apex of the pyramid that is perpendicular to the base of the pyramid. When the center axes of two cylinder, prism or pyramidal structures share the same line they are said to be aligned. When the center axes of two cylinder, prism or pyramidal structures do not share the same line they are said to be offset.

Chamber: As used in this disclosure, a chamber is an enclosed or enclosable negative space that is dedicated to a purpose.

Check Valve: As used in this disclosure, a check valve is a valve that permits the flow of fluid in a single direction. Within selected potential embodiments of this disclosure, the check valve is a commercially available product that is selected from the group consisting of a ball valve and a Tesla valve.

Composite Prism: As used in this disclosure, a composite prism refers to a structure that is formed from a plurality of structures selected from the group consisting of a prism structure and a pyramid structure. The plurality of selected structures may or may not be truncated. The plurality of prism structures are joined together such that the center axes of each of the plurality of structures are aligned. The congruent ends of any two structures selected from the group consisting of a prism structure and a pyramid structure need not be geometrically similar.

Congruent: As used in this disclosure, congruent is a term that compares a first object to a second object. Specifically, two objects are said to be congruent when: 1) they are geometrically similar; and, 2) the first object can superimpose over the second object such that the first object aligns, within manufacturing tolerances, with the second object.

Correspond: As used in this disclosure, the term correspond is used as a comparison between two or more objects wherein one or more properties shared by the two or more objects match, agree, or align within acceptable manufacturing tolerances.

Diode: As used in this disclosure, a diode is a two terminal semiconductor device that allows current flow in only one direction. The two terminals are called the anode and the cathode. Electric current is allowed to pass from the anode to the cathode.

Disk: As used in this disclosure, a disk is a prism-shaped object that is flat in appearance. The disk is formed from two congruent ends that are attached by a lateral face. The sum of the surface areas of two congruent ends of the prism-shaped object that forms the disk is greater than the surface area of the lateral face of the prism-shaped object that forms the disk. In this disclosure, the congruent ends of the prism-shaped structure that forms the disk are referred to as the faces of the disk.

Electric Motor: In this disclosure, an electric motor is a machine that converts electric energy into rotational mechanical energy. An electric motor typically comprises a stator and a rotor. The stator is a stationary hollow cylindrical structure that forms a magnetic field. The rotor is a magnetically active rotating cylindrical structure that is coaxially mounted in the stator. The magnetic interactions between the rotor and the stator physically causes the rotor to rotate within the stator thereby generating rotational mechanical energy. This disclosure assumes that the power source is an externally provided source of DC electrical power. The use of DC power is not critical and AC power can be used by exchanging the DC electric motor with an AC motor that has a reversible starter winding.

External Power Source: As used in this disclosure, an external power source is a source of the energy that is externally provided to enable the operation of the present disclosure. Examples of external power sources include, but are not limited to, electrical power sources and compressed air sources.

Fan: As used in this disclosure, a fan is a pump that moves a gas. The first potential embodiment of this disclosure assumes that the fan is a mechanical device with rotating blades that is used to create a flow or current of a gas.

Form Factor: As used in this disclosure, the term form factor refers to the size and shape of an object.

Geometrically Similar: As used in this disclosure, geometrically similar is a term that compares a first object to a second object wherein: 1) the sides of the first object have a one to one correspondence to the sides of the second object; 2) wherein the ratio of the length of each pair of corresponding sides are equal; 3) the angles formed by the first object have a one to one correspondence to the angles of the second object; and, 4) wherein the corresponding angles are equal. The term geometrically identical refers to a situation where the ratio of the length of each pair of corresponding sides equals 1.

Housing: As used in this disclosure, a housing is a rigid casing that encloses and protects one or more devices.

Lead: As used in this disclosure, a lead is a conductor that is physically used to electrically connect an electrical component into a larger circuit assembly.

LED: As used in this disclosure, an LED is an acronym for a light emitting diode. A light emitting diode is a diode that is also a light source.

Limit Resistor: As used in this disclosure, a limit resistor is an electrical resistor that is used to limit the flow of electric current through an electrical circuit.

Load Resistor: As used in this disclosure, a load resistor is an electrical resistor that is used to present a voltage to an electrical device or electrical circuit element. The presented voltage is controlled by controlling the amount of electrical current passing through the load resistor.

Maintained Switch: A used in this disclosure, a maintained switch is a switch that maintains the position that was set in the most recent switch actuation. A maintained switch works in an opposite manner to a momentary switch.

Momentary Switch: As used in this disclosure, a momentary switch is a biased switch in the sense that the momentary switch has a baseline position that only changes when the momentary switch is actuated (for example when a pushbutton switch is pushed or a relay coil is energized). The momentary switch then returns to the baseline position once the actuation is completed. This baseline position is called the "normal" position. For example, a "normally open" momentary switch interrupts (open) the electric circuit in the baseline position and completes (closes) the circuit when the momentary switch is activated. Similarly, a "normally closed" momentary switch will complete (close) an electric circuit in the baseline position and interrupt (open) the circuit when the momentary switch is activated.

Motor: As used in this disclosure, a motor refers to the method of transferring energy from an external power source into rotational mechanical energy.

Not Significantly Different: As used in this disclosure, the term not significantly different compares a specified property of a first object to the corresponding property of a reference object (reference property). The specified property is considered to be not significantly different from the reference property when the absolute value of the difference between the specified property and the reference property is less than 10.0% of the reference property value. A negligible difference is considered to be not significantly different.

One to One: When used in this disclosure, a one to one relationship means that a first element selected from a first set is in some manner connected to only one element of a second set. A one to one correspondence means that the one to one relationship exists both from the first set to the second set and from the second set to the first set. A one to one fashion means that the one to one relationship exists in only one direction.

Plant: As used in this disclosure, a plant is a biological organism: 1) that is not capable of movement over significant distances; and 2) that uses photosynthesis to create nutrients. A stationary biological organism that is not capable of movement over significant distances but does not use photosynthesis is referred to as a parasitic plant. In the vernacular, the term plant will often include parasitic plants. The intention of this disclosure is to include parasitic plants in the definition of a plant.

Plug: As used in this disclosure, a plug is an electrical termination that electrically connects a first electrical circuit to a second electrical circuit or a source of electricity. As used in this disclosure, a plug will have two or three metal pins.

Port: As used in this disclosure, a port is an electrical termination that is used to connect a first electrical circuit to a second external electrical circuit. In this disclosure, the port is designed to receive a plug.

Prism: As used in this disclosure, a prism is a three-dimensional geometric structure wherein: 1) the form factor of two faces of the prism are congruent; and, 2) the two congruent faces are parallel to each other. The two congruent faces are also commonly referred to as the ends of the prism. The surfaces that connect the two congruent faces are called the lateral faces. In this disclosure, when further description is required a prism will be named for the geometric or descriptive name of the form factor of the two congruent faces. If the form factor of the two corresponding faces has no clearly established or well-known geometric or descriptive name, the term irregular prism will be used. The center axis of a prism is defined as a line that joins the center point of the first congruent face of the prism to the center point of the second corresponding congruent face of the prism. The center axis of a prism is otherwise analogous to the center axis of a cylinder. A prism wherein the ends are circles is commonly referred to as a cylinder.

Pull-Down Resistor: As used in this disclosure, a pull-down resistor is an electrical resistor that is used within an electrical circuit as a load resistor or a limit resistor.

Pump: As used in this disclosure, a pump is a mechanical device that uses suction or pressure to raise or move fluids, compress fluids, or force a fluid into an inflatable object. Within this disclosure, a compressor refers to a pump that is dedicated to compressing a fluid or placing a fluid under pressure.

Resistor: As used in this disclosure, a resistor is a well-known and commonly available electrical device that inhibits the flow of electricity through an electric circuit. Within an electric circuit processing alternating currents, the resistor will not affect the phase of the alternating current. A current flowing through a resistor will create a voltage across the terminals of the resistor.

Switch: As used in this disclosure, a switch is an electrical device that starts and stops the flow of electricity through an electric circuit by completing or interrupting an electric circuit. The act of completing or breaking the electrical circuit is called actuation. Completing or interrupting an electric circuit with a switch is often referred to as closing or opening a switch respectively. Completing or interrupting an electric circuit is also often referred to as making or breaking the circuit respectively.

Threaded Connection: As used in this disclosure, a threaded connection is a type of fastener that is used to join a first cylindrical object and a second cylindrical object together. The first cylindrical object is fitted with a first fitting selected from an interior screw thread or an exterior screw thread. The second cylindrical object is fitted with the remaining screw thread. The cylindrical object fitted with the exterior screw thread is placed into the remaining cylindrical object such that: 1) the interior screw thread and the exterior screw thread interconnect; and, 2) when the cylindrical object fitted with the exterior screw thread is rotated the rotational motion is converted into linear motion that moves the cylindrical object fitted with the exterior screw thread either into or out of the remaining cylindrical object. The direction of linear motion is determined by the direction of rotation.

Tool: As used in this disclosure, a tool is a device, an apparatus, or an instrument that is used to carry out an activity, operation, or procedure.

Tube: As used in this disclosure, the term tube is used to describe a rigid hollow prism with two open ends. While tubes that are suitable for use in this disclosure are often used to transport or conveys fluids or gases, the purpose of the tubes in this disclosure are structural. In this disclosure, the terms inner dimension and outer dimension of a tube are used as they would be used by those skilled in the plumbing arts.

USB: As used in this disclosure, USB is an acronym for Universal Serial Bus which is an industry standard that defines the cables, the connectors, the communication protocols and the distribution of power required for interconnections between electronic devices. The USB standard defines several connectors including, but not limited to, USB-A, USB-B, mini-USB, and micro USB connectors. A USB cable refers to a cable that: 1) is terminated with USB connectors; and, 2) that meets the data transmission standards of the USB standard.

Valve: As used in this disclosure, a valve is a device that is used to control the flow of a fluid (gas or liquid) through a pipe.

Vacuum: As used in this disclosure, vacuum is used to describe a first space that contains gas at a reduced gas pressure relative to the gas pressure of a second space. If the first space and the second space are connected together, this pressure differential will cause gas from the second space to move towards the first space until the pressure differential is eliminated.

Vernacular: As used in this disclosure, the vernacular is a noun that refers to the common meaning and usage of a word as opposed to a specialized or more specific meaning and usage of the same word by a person skilled in an art.

Working Element: As used in this disclosure, the working element of a tool is the physical element on the tool that performs the actual activity, operation, or procedure the tool is designed to perform. For example, the cutting edge of a blade is the working element of a knife.

With respect to the above description, it is to be realized that the optimum dimensional relationship for the various components of the invention described above and in FIGS. 1 through 8 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. A handheld herb grinder comprising:
a housing, a vacuum device, a grinding device, and a control circuit;
wherein the housing contains the vacuum device, the grinding device, and the control circuit;
wherein the handheld herb grinder is configured for use in grinding plant-based material;
wherein the plant-based material is presented to the handheld herb grinder in a bulk solid form;
wherein the vacuum device creates a pressure differential that draws the plant-based material into the housing;
wherein the control circuit controls the operation of the grinding device and the vacuum device;
wherein the housing forms an exterior shell of the handheld herb grinder;
wherein the grinding device is a mechanical device that reduces the plant-based material into smaller particulates of comparable size;
wherein the control circuit is an electrical circuit;
wherein the housing comprises an intake chamber, a pressure chamber, a storage chamber, and a plurality of threaded connections;
wherein the intake chamber contains a portion of the vacuum device;
wherein the pressure chamber contains a portion of the vacuum device;
wherein the storage chamber contains the grinding device;
wherein the intake chamber is a hollow prism-shaped capped tube;
wherein the pressure chamber is a hollow prism-shaped tube;
wherein the storage chamber is a hollow prism-shaped capped tube;
wherein a form factor of two congruent faces of the pressure chamber is geometrically similar to a form factor of two congruent faces of the intake chamber;
wherein a form factor of two congruent faces of the storage chamber is geometrically similar to the form factor of the two congruent faces of the pressure chamber;
wherein each of the plurality of threaded connections is a threaded connection;
wherein each of the plurality of threaded connections forms an attachment selected from the group consisting of: a) an open congruent face of the two congruent faces of the intake chamber to an open congruent face of the two congruent faces of the pressure chamber; and, b) an open congruent face of the two congruent faces of the storage chamber to a second open congruent face of the two congruent faces of the pressure chamber.

2. The handheld herb grinder according to claim 1
wherein the intake chamber further comprises an intake aperture;
wherein the vacuum device draws the plant-based material through the intake aperture into the intake chamber;
wherein the intake aperture is an aperture;
wherein the intake aperture is formed through a closed congruent face of the intake chamber;
wherein the storage chamber further comprises a discharge aperture;
wherein the discharge aperture is a nozzle formed through a closed congruent face of the storage chamber;
wherein the ground plant-based material is discharged from the storage chamber through the discharge aperture;
wherein the nozzle that forms the discharge aperture opens and closes.

3. The handheld herb grinder according to claim 2
wherein the vacuum device is a mechanical device;
wherein the vacuum device comprises a fan;
wherein the fan is a mechanical device that generates a second pressure differential which is used for transporting the air and the plant-based material from an exterior of the intake chamber through both the intake aperture and the intake chamber into the pressure chamber.

4. The handheld herb grinder according to claim 3
wherein the fan further comprises a vacuum blade assembly and a vacuum motor;
wherein the vacuum motor rotates the vacuum blade assembly;

wherein the vacuum motor is further defined with a ninth lead and a tenth lead.

5. The handheld herb grinder according to claim 4
wherein the vacuum blade assembly is a rotating blade;
wherein the vacuum motor is an electric motor;
wherein the vacuum motor provides motive forces required by the fan to generate a third pressure differential.

6. The handheld herb grinder according to claim 5
wherein the grinding device comprises a flow drive, a grinder blade assembly, and a grinder motor;
wherein the flow drive is driven by the grinder motor;
wherein the grinder blade assembly is rotated by the grinder motor;
wherein the grinder motor is further defined with an eleventh lead and a twelfth lead.

7. The handheld herb grinder according to claim 6
wherein the flow drive is a rotating blade;
wherein the flow drive drives the plant-based material towards the grinder blade assembly.

8. The handheld herb grinder according to claim 7
wherein the grinder blade assembly is a rotating blade;
wherein the grinder motor is an electric motor;
wherein the grinder motor provides motive forces required by the grinder blade assembly to grind the plant-based material.

9. The handheld herb grinder according to claim 8
wherein the control circuit comprises a plurality of switches, a lamp, and a power circuit;
wherein each of the plurality of switches is an electrical switch that forms a circuit element within the control circuit;
wherein each of the plurality of switches controls the flow of electricity into an electrical sub-circuit of the control circuit selected from the group consisting of the vacuum motor, the grinder motor, and the lamp;
wherein the lamp generates illumination used to illuminate the plant-based material as it is drawn into the intake aperture by the vacuum device;
wherein the power circuit is an electrical sub-circuit of the control circuit;
wherein the power circuit stores and distributes the electrical energy necessary to operate the handheld herb grinder.

10. The handheld herb grinder according to claim 9
wherein the plurality of switches comprises a first momentary switch, a second momentary switch, and an illumination switch;
wherein the illumination switch is further defined with a first lead and a second lead;
wherein the first momentary switch is further defined with a third lead and a fourth lead;
wherein the second momentary switch is further defined with a fifth lead and a sixth lead;
wherein the first momentary switch controls the flow of electrical energy from the power circuit into the grinder motor;
wherein the second momentary switch controls the flow of electrical energy from the illumination switch into the vacuum motor;
wherein the illumination switch controls the flow of electrical energy from the power circuit into the lamp;
wherein the illumination switch further controls the flow of electrical energy from the power circuit into the second momentary switch;
wherein the lamp comprises Light Emitting Diode (LED) and a pull-down resistor;
wherein the LED is further defined with a second anode and a second cathode;
wherein the pull-down resistor is further defined with a seventh lead and an eighth lead;
wherein the LED generates the illumination used by the lamp to illuminate the plant-based material as it is drawn into the intake aperture;
wherein the pull-down resistor is a circuit element that is placed in series with the LED.

11. The handheld herb grinder according to claim 10
wherein the power circuit comprises a battery, a diode, a charging port, and an external power source;
wherein the external power source further comprises a charging plug;
wherein the battery is further defined with a first positive terminal and a first negative terminal;
wherein the external power source is further defined with a second positive terminal and a second negative terminal;
wherein the diode is further defined with a first anode and a first cathode;
wherein the charging port is further defined with a thirteenth lead and a fourteenth lead;
wherein the charging plug is further defined with a fifteenth lead and a sixteenth lead;
wherein the battery is a rechargeable battery;
wherein the charging port is an electrical circuit that reverses the polarity of the rechargeable battery and provides the energy necessary to reverse the chemical processes that the rechargeable battery initially used to generate the electrical energy;
wherein the charging port attaches to the external power source using the charging plug;
wherein the charging port receives electrical energy from the external power source through the charging plug;
wherein the diode is an electrical device that allows current to flow in only one direction;
wherein the diode installs between the rechargeable battery and the charging port such that electricity will not flow from the first positive terminal of the rechargeable battery into the second positive terminal of the external power source.

12. The handheld herb grinder according to claim 11
wherein the plurality of threaded connections comprises a first threaded connection and a second threaded connection;
wherein the first threaded connection is the threaded connection selected from the plurality of threaded connections that attaches the open congruent face of the intake chamber to the open congruent face of the pressure chamber;
wherein the second threaded connection is the threaded connection selected from the plurality of threaded connections that attaches the open congruent face of the storage chamber to the second open congruent face of the pressure chamber.

13. The handheld herb grinder according to claim 12
wherein the first positive terminal of the battery electrically connects to the first lead of the illumination switch;
wherein the first positive terminal of the battery electrically connects to the third lead of the first momentary switch;
wherein the second lead of the illumination switch electrically connects to the fifth lead of the second momentary switch;

wherein the second lead of the illumination switch electrically connects to the second anode of the LED;

wherein the second cathode of the LED electrically connects to the seventh lead of the pull-down resistor;

wherein the sixth lead of the second momentary switch electrically connects to the ninth lead of the vacuum motor;

wherein the fourth lead of the first momentary switch electrically connects to the eleventh lead of the grinder motor;

wherein the second positive terminal of the external power source electrically connects to the fifteenth lead of the charging plug;

wherein the fifteenth lead of the charging plug electrically connects to the thirteenth lead of the charging port;

wherein the thirteenth lead of the charging port electrically connects to the first anode of the diode;

wherein the first cathode of the diode electrically connects to the first positive terminal of the battery;

wherein the second negative terminal of the external power source electrically connects to the sixteenth lead of the charging plug;

wherein the sixteenth lead of the charging plug electrically connects to the fourteenth lead of the charging port;

wherein the fourteenth lead of the charging port electrically connects to the first negative terminal of the battery;

wherein the tenth lead of the vacuum motor electrically connects to the first negative terminal of the battery;

wherein the eighth lead of the pull-down resistor electrically connects to the first negative terminal of the battery;

wherein the twelfth lead of the grinder motor electrically connects to the first negative terminal of the battery.

* * * * *